United States Patent
Theisen et al.

[11] Patent Number: 5,885,447
[45] Date of Patent: Mar. 23, 1999

[54] LIQUID FILTRATION SYSTEM INCORPORATING A BYPASS FILTER ELEMENT

[75] Inventors: Jeffrey J. Theisen, Prior Lake; Kathryn A. Legault, Bloomington, both of Minn.

[73] Assignee: Donaldson Company, Inc., Minneapolis, Minn.

[21] Appl. No.: 888,372

[22] Filed: Jul. 3, 1997

[51] Int. Cl.⁶ .................................................. B01D 35/147
[52] U.S. Cl. .......................... 210/132; 210/314; 210/440; 210/450
[58] Field of Search .................................... 210/132, 316, 210/323.2, 440, 450, 130, 322, 323.1, 340, 443, 444; 137/543.15

[56] References Cited

U.S. PATENT DOCUMENTS

| | | |
|---|---|---|
| 3,297,162 | 1/1967 | Mouwen . |
| 3,397,786 | 8/1968 | Hultgren .................................. 210/132 |
| 3,469,697 | 9/1969 | Kudalty .................................... 210/132 |
| 3,529,722 | 9/1970 | Humbert, Jr. . |
| 3,822,787 | 7/1974 | Shaltis et al. . |
| 4,053,409 | 10/1977 | Kuhfuss, Jr. . |
| 4,222,875 | 9/1980 | Sikula, Jr. . |
| 4,364,825 | 12/1982 | Connor, Jr. . |
| 4,369,113 | 1/1983 | Stifelman . |
| 4,428,834 | 1/1984 | McBroom et al. . |
| 4,446,019 | 5/1984 | Robinson . |
| 4,480,160 | 10/1984 | Stifelman . |
| 4,512,882 | 4/1985 | Fischer et al. . |
| 4,522,712 | 6/1985 | Fischer et al. . |
| 4,611,627 | 9/1986 | Eidsvoog et al. . |
| 4,615,800 | 10/1986 | Stifelman et al. . |
| 4,743,374 | 5/1988 | Stifelman . |
| 4,832,844 | 5/1989 | Ayers . |
| 4,834,885 | 5/1989 | Misgen et al. . |
| 4,853,118 | 8/1989 | Brownell et al. . |
| 4,872,976 | 10/1989 | Cudaback . |
| 4,883,083 | 11/1989 | Fisher et al. . |
| 4,935,127 | 6/1990 | Lowsky et al. . |
| 4,990,247 | 2/1991 | Vandenberk . |
| 5,037,537 | 8/1991 | Hutchins et al. . |
| 5,104,537 | 4/1992 | Stifelman et al. . |
| 5,342,519 | 8/1994 | Friedmann et al. . |
| 5,395,518 | 3/1995 | Gulsvig . |
| 5,501,791 | 3/1996 | Theisen et al. . |

FOREIGN PATENT DOCUMENTS

| | | | |
|---|---|---|---|
| 1023178 | 3/1966 | United Kingdom | .................... 210/132 |

Primary Examiner—Matthew O. Savage
Attorney, Agent, or Firm—Merchant, Gould, Smith, Edell, Welter & Schmidt, P.A.

[57] ABSTRACT

A filter arrangement for filtering fluid comprises a housing having an inlet and an outlet, a first cylindrical construction, a second cylindrical construction, and a bypass arrangement. The first construction includes filter media mounted within the housing. The first construction defines a first open filter interior. The first open filter interior includes a first dimension being a largest dimension across a cross-section of the first open filter interior. The second construction includes a filtration construction mounted within the housing. The second construction defines a second open filter interior. The second open filter interior includes a second dimension being a largest dimension across a cross-section of the second open filter interior. The second dimension is at least as large as the first dimension. The bypass arrangement has an open position and a closed position. In the open position, the bypass arrangement is constructed and arranged to permit fluid flow from the housing inlet through the second filtration construction; in the closed position, the bypass arrangement is constructed and arranged to disallow fluid flow from the housing inlet and through the second filtration construction.

17 Claims, 4 Drawing Sheets

LIQUID FILTRATION SYSTEM INCORPORATING A BYPASS FILTER ELEMENT

FIELD OF THE INVENTION

This invention relates generally to fluid filters and methods. More particularly, this invention relates to liquid fluid filters and methods used in lubricating systems.

BACKGROUND OF THE INVENTION

Filters have been employed in a variety of applications including hydraulic systems, fuel systems, and engine lubrication systems. Such filters may generally be spin-on type filters and include a filter element within a can or housing having a cover or attachment plate at one end by which the filter can be screwed onto or off of a filter head. A central opening and several surrounding openings in the cover are typically provided to direct flow through the filter and filter element therein, which flow can be either an inside/out or outside/in direction relative to the filter element. A circular gasket on the outside of the cover serves as the external seal between the filter and the filter head, while another circular gasket on the inside of the cover functions as an internal seal between portions of the filter element and the cover. Spin-on filters are usually used only once before removal and replacement.

Eventually, the filter element becomes clogged requiring replacement of the filter. However, it is not always easily known when it is appropriate to change the filter. Sometimes, the filter element becomes clogged, and the fluid to be filtered backs up and causes problems in the system. Also, it can stop fluid flow to downstream system components. Because of this, in addition to problems created during cold starts and flow surge conditions, bypass valves have been equipped in the filter head. When the pressure in the spin-on filter exceeds a certain amount due to, for example, a clogged filter element, a cold start condition, or a flow surge, the bypass valve opens and permits fluid to continue downstream through the system. This can be problematic, as it allows completely unfiltered fluid which may have substantial contaminants therein to pass through the system. This can lead to transmission problems and/or damage to the components of an internal combustion engine.

SUMMARY OF THE INVENTION

The present invention is directed to a filter arrangement for filtering a fluid, typically liquid. To achieve the advantages of the invention and in accordance with the purposes of the invention, as embodied and broadly described herein, a filter arrangement for filtering fluid comprises a housing having an inlet and an outlet, a first construction, a second construction, and a bypass arrangement. The first construction includes filter media mounted within the housing. The first construction defines a first open filter interior. The first open filter interior includes an inner dimension being a largest dimension across a cross-section of the first open filter interior. Typically, this inner dimension will be a diameter, in cylindrical arrangements. The second construction includes a filtration construction mounted within the housing. The second construction defines a second open filter interior. The second open filter interior includes an inner dimension being a largest dimension across a cross-section of the second open filter interior. Typically, this inner dimension will be a diameter, in cylindrical arrangements. The second open filter interior inner dimension is at least as large as the first open filter interior inner dimension. The bypass arrangement has an open position and a closed position. In the open position, the bypass arrangement is constructed and arranged to permit fluid flow from the housing inlet through the second filtration construction; in the closed position, the bypass arrangement is constructed and arranged to disallow fluid flow from the housing inlet and through the second filtration construction.

Preferably, the bypass arrangement includes a valve arrangement constructed and arranged to move from the closed position to the open position in response to a selected liquid flow pressure buildup on an upstream side of the filter media in the first construction.

In one preferred embodiment, the arrangement includes first and second end caps on opposite ends of the first construction. The first end cap defines an aperture in fluid communication with the first open filter interior; and the second end cap defines an aperture in fluid communication with the first open filter interior. First and second end caps may be positioned on opposite ends of the second construction. The first end cap on the second construction includes an aperture in fluid communication with the second open filter interior and the aperture in the second end cap of the first construction. The second end cap in the second construction may close the second open filter interior.

Preferably, the valve arrangement includes a seal member movably mounted within the aperture of the second end cap of the first construction. The seal member may be constructed and arranged to block the aperture when in the closed position; and the seal member may be constructed and arranged to open the aperture when in the open position. The open position allows fluid communication between the first and second open filter interiors through the first construction second end cap aperture and the second construction first end cap apertures.

In one embodiment, the valve arrangement includes a biasing member and a collar.

In another embodiment, the valve arrangement includes a biasing member and a cage.

Preferably, the first construction filter media has a different initial efficiency for filtering than the second construction filtration construction. The first construction filter media may include a cylindrical element of pleated paper media. The second construction filtration construction may include a screen arrangement.

In one embodiment, the housing outlet includes a tubular construction within the aperture of the first end cap of the first construction; the tubular construction being in communication with the first open filter interior. A radial seal may be between the tubular construction and the first end cap of the first construction. An axial seal member may be between the first and second constructions.

In one embodiment, the first construction is cylindrical and includes an outer diameter and an inner diameter; and the second construction is cylindrical and includes an outer diameter and an inner diameter. Preferably, the second construction inner diameter is at least as large as the first construction inner diameter. Preferably, the second construction outer diameter is greater than the first construction inner diameter. Preferably, the second construction outer diameter is equal to the first construction outer diameter.

In another aspect, a filter arrangement for filtering fluid comprises a housing, a first construction, a second construction, and a bypass arrangement. The housing has an inlet, an outlet, a first end, and a second end. The first construction includes filter media mounted within the housing adjacent to the first end of the housing. The first cylindrical construction defines a first open filter interior. The second construction includes a filter screen mounted within the housing adjacent to the second end of the housing. The second construction defines a second open filter interior. The second construction includes no portion within the first open filter interior. The bypass arrangement is constructed and arranged to selectively permit fluid flow from the housing inlet through the filter screen and into the first open filter interior.

Preferably, the first cylindrical construction is axially stacked on the second cylindrical construction.

Preferably, the bypass arrangement includes a valve member constructed and arranged to open and close in response to a selected liquid flow pressure buildup on an upstream side of the filter media.

In one embodiment, the first construction is cylindrical and includes first and second end caps, wherein the filter media is potted within the first construction first and second end caps. The second construction may be cylindrical and includes first and second end caps, wherein the filter screen is potted within the second construction first and second end caps.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention. In the drawings:

DETAILED DESCRIPTION OF THE PREFERRED EMBODIMENTS

Reference will now be made in detail to the present preferred embodiments of the invention, examples of which are illustrated in the accompanying drawings.

The present invention solves problems associated with the prior art arrangements by providing a bypass valve and second stage filter internal to a filter housing. During normal operation, fluid is filtered through the main filter element. When the filter element becomes clogged, or if there is a cold start or a flow surge condition, the bypass valve opens and fluid is filtered through the second stage filter element and allowed to exit the filter housing. This has advantages over prior art arrangements. For example, the bypass valve and second stage filter are internal to the housing assembly. No additional components or space is required, as is the case with certain prior art arrangements. The arrangement of the present invention protects the downstream system and components during cold start and flow surge conditions. The present invention solves the problem of unfiltered oil passing through a bypass valve in the filter head during conditions of these types, which, in the prior art, would allow large contaminants to pass downstream of the filter.

Figure 1:
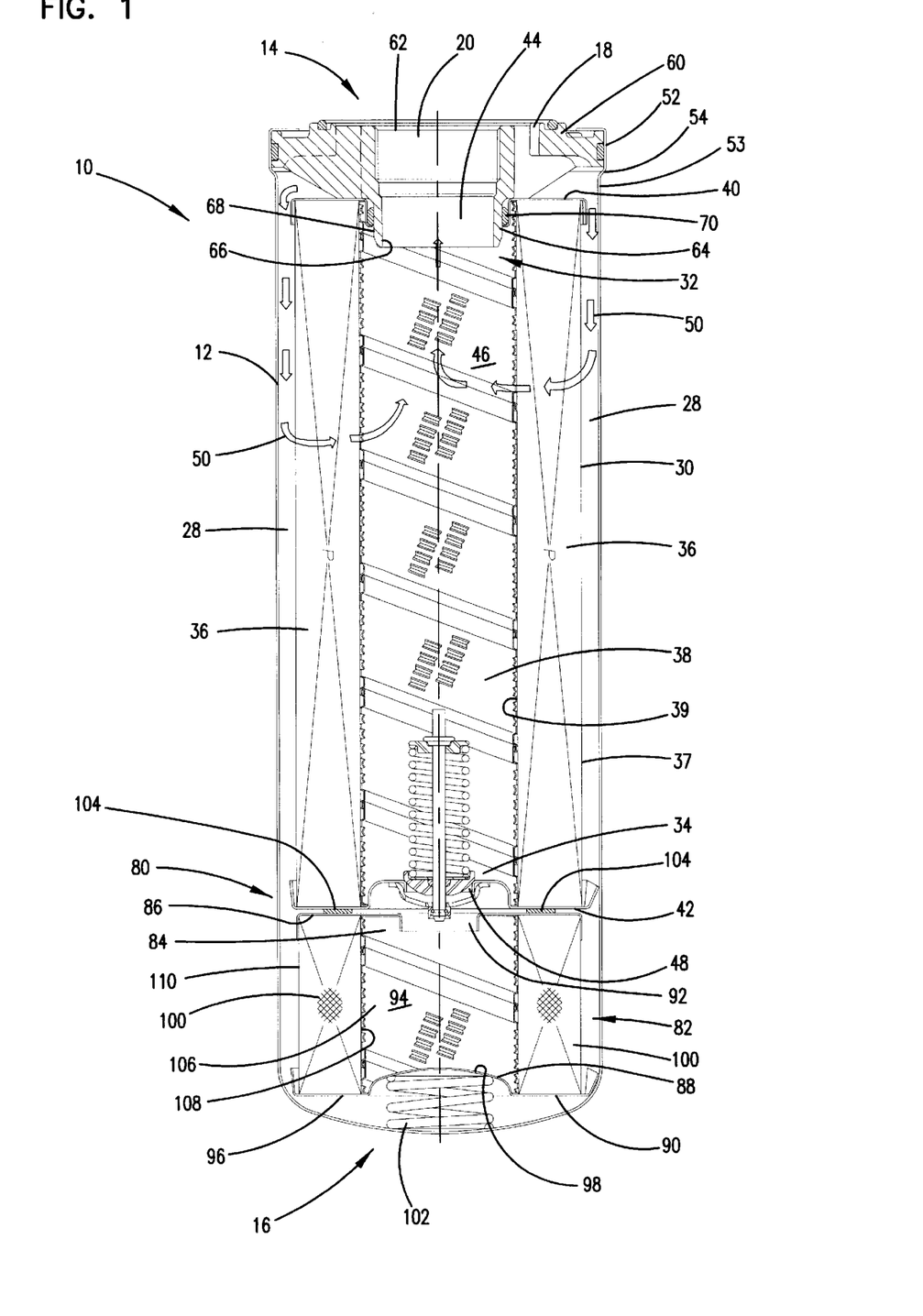
FIG. 1 is a cross-sectional view of a first embodiment of a fluid filter, according to the present invention.

In accordance with the invention, a filter arrangement for filtering a fluid is provided. As embodied herein, one example of a filter arrangement is illustrated in FIG. 1 generally at 10. Filter arrangement 10 filters fluids including gas or liquids, and more particularly, liquids such as oil, hydraulic fluids, or other lubricating types of fluids, for example. Filter arrangement 10 includes a generally cylindrical filter housing 12 having an open end 14 and a closed end 16. Filter housing 12 is of a generally thin walled construction, and is typically formed from metal such as steel or other suitable materials. Filter housing 12 includes an inlet 18 in which fluid to be filtered enters housing 12. Housing 12 includes an outlet 20 through which filtered fluid passes as it exits housing 12. The filter arrangement 10 illustrated in FIG. 1 is a spin-on filter. However, other types of filter arrangements may be used in accordance with the principles of the invention described herein.

In accordance with the invention, a first filtering construction for filtering fluid is mounted within the housing. As embodied herein, FIG. 1 illustrates one example of a filter element 30 mounted within housing 12. Filter element 30 has a cylindrical shape with an outer diameter and an inner diameter. Element 30 also includes an open end 32 and a closed end 34. Open end 32 is covered by an end cap 40. End cap 40 includes an opening 44 to permit access to an interior 46, which is defined by the inner diameter of filter element 30. Closed end 34 of filter element 30 is covered by an end cap 42. End cap 42 cooperates with a bypass arrangement, to be described in more detail below. During normal filter operation, end cap 42 completely closes the end 34 of filter element 30, blocking access to filter interior 46 through end 34. When the bypass arrangement is activated, end cap 42 has an opening 48 which is exposed, and allows fluid to pass through opening 48 and into filter interior 46. End cap 42 includes a straight portion 43 (FIG. 2) which curves at surface 45 to define a bypass arrangement seating portion 47.

End caps 40, 42 are illustrated in the figures as sheet metal end caps with filter media 36 potted therein by a polymeric binder such as urethane. However, it is contemplated that end caps 40, 42 may also be constructed from a polymeric material.

Filter element 30 has a perforated inner liner 38 located on an interior surface 39. Preferably, inner liner 38 is constructed of metal, but can be made of other materials, such as plastic. Filter media 36 surrounds the perforated inner liner 38 and also forms an exterior surface 37 of the filter element 30. Filter media 36 may be any media sufficient to effectively filter whatever fluid is in the system. The type of media will depend upon what fluid is being filtered, what kind of system the filter is in, and could include other variables. In terms of the principles of operation of the bypass arrangement, there is no preference for any particular type of filter media. However, in a typical system, filter media 36 can include a fluted or pleated media. Typically, this may include paper media or cellulose fiber media, sometimes including at least one side treated with polymeric fine fibers or expanded polytetrafluoroethylene (PTFE). Other types of media may also be used.

Fluid is filtered by passing through filter element 30 in a direction from exterior surface 37 through filter media 36 and inner liner 38. Arrows 50 in FIG. 1 illustrate a typical flow path of fluid through filter arrangement 10.

The above-described general operation of filter arrangement 10 is of a type described in U.S. Pat. No. 4,369,113 to Stifelman, hereby incorporated by reference. As described in U.S. Pat. No. 4,369,113, fluid filters may be utilized for filtering from the inside outwardly, or the outside inwardly. For the preferred embodiment described herein, the filter is described with respect to filtration flow resulting from the outer annular space 28 into filter interior 46. However, the opposite arrangement may be utilized with appropriate modifications in the filter head, as will be understood to those of ordinary skill in the art.

Filter arrangement 10 includes a cover 60 disposed within housing 12 and adjacent to open end 14 to close off open end 14 of housing 12. Structure is provided to mount cover 60 to housing 12 to form a single unitary filter 10. The housing 12 includes a first region 52 proximate to the inlet and outlet, and a second region 53 adjacent to the first region. The first region 52 has a larger diameter than the second region 53 to form a transition region 54. The transition region 54 acts as a shoulder for cover 60 to rest upon. The housing 12 is rolled over the cover 60 to close and seal the filter element 30 within the arrangement 10. Cover 60 includes a central cylindrical opening 62 defined by a tubular construction 64. Tubular construction 64 includes an internal cylindrical wall 66 and an external cylindrical wall 68. Tubular construction 64 is sized to fit within open end 32 of filter element 30. Specifically, tubular construction 64 fits within opening 44 in end cap 40 and is in a sealing engagement therewith. A seal member 70 forms a radial seal between external wall 68 of tubular construction 64 and end cap 40 of filter element 30. Tubular construction 64 permits a filtered fluid to flow from filter arrangement 10 to a filter head. As such, tubular construction 64 forms part of the housing outlet 20. Internal wall 66 includes threads for mateably engaging the filter head, such that filter arrangement 10 may be spun onto the assembly.

Should filter element 30 become substantially occluded, or if there is a cold start or flow surge condition, the filter arrangement of the present invention includes a bypass system for dealing with these conditions. One solution offered by the present invention is to sense when such conditions, such as an occluded filter, a flow surge condition, or a cold start condition, are occurring. This may be sensed by such means as an electronic sensor, or a mechanical pressure type sensor. Once the pressure has exceeded a certain predetermined point, the fluid is filtered to a secondary filter element and allowed to pass through the outlet and into the filter head.

Figure 2:
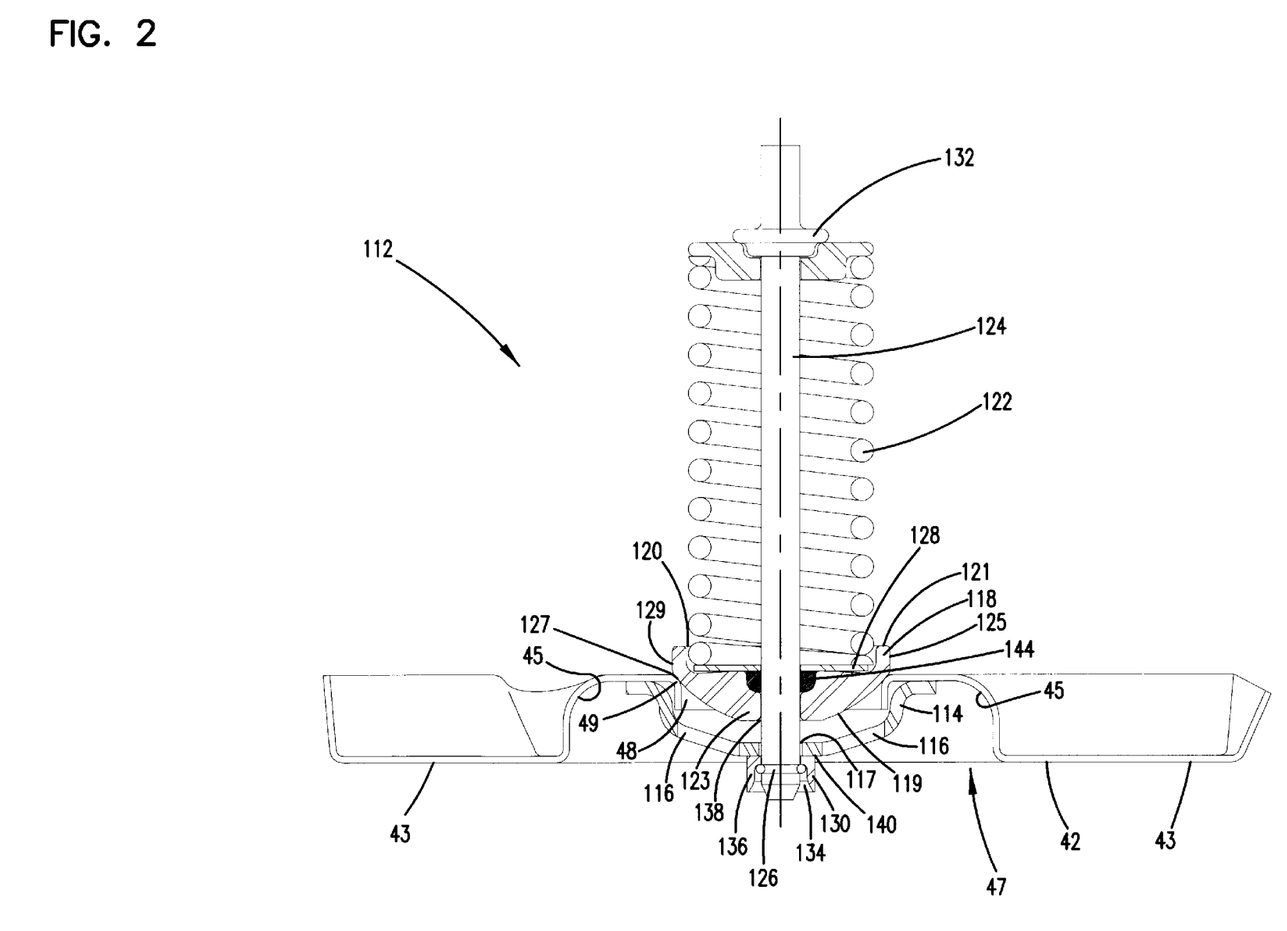
FIG. 2 is an enlarged cross-sectional view of a valve arrangement depicted in FIG. 1, according to the present invention.

In one embodiment illustrated in FIGS. 1 and 2, a bypass arrangement is shown generally at 80. In this specific illustrated embodiment, bypass arrangement 80 includes a second filter construction 82 positioned adjacent to the closed end 34 of filter element 30. That is, secondary filter 82 is positioned between closed end 34 of filter element 30 and closed end 16 of housing 12. Thus, the primary filter element 30 is stacked on top of secondary filter element 82 and is in axially alignment therewith. In the particular embodiment illustrated in FIG. 1, no portion of the secondary filter element 82 is within the interior 46 of the primary filter element 30.

Secondary filter element 82 may be cylindrical in shape including an outer diameter and an inner diameter. Preferably, the inner diameter of the secondary filter element is at least as large as the inner diameter of the primary filter element 30. Preferably, and as illustrated in FIG. 1, the outer diameter of the secondary filter element 82 is as large as the outer diameter of the primary filter element 30; while the outer diameter of the secondary filter element 82 is at least as large as, and preferably greater than, the inner diameter of the primary filter element 30.

Secondary filter element 82 has an open end 84 covered by end cap 86, and a closed end 88 covered by closed end cap 90. End caps 86, 90 are constructed from sheet metal; however, other types of materials are contemplated, such as a polymeric material. End cap 86 defines an open aperture 92 which provides access to an interior 94 to secondary filter element. End cap 90 closes secondary filter element 82 from end 88. As illustrated in FIG. 1, end cap 90 includes a relatively straight portion 96 adjacent to the filtration construction 100 and a curved portion forming a dome-like structure 98 adjacent to the filter interior 94. A spring 102 is positioned between closed end 16 of housing 12 and dome-like structure 98. Spring 102 engages dome-like structure 98 to bias secondary filter element 82 toward first filter element 30. An axial seal member 104, a gasket, for example, is positioned between open end cap 86 of secondary filter element 82 and closed end cap 42 of filter element 30. Therefore, it can be seen that spring 102 compresses the two filter elements together at axial seal member 104 to form an axial seal.

Secondary filter element 82 has a perforated inner liner 106 located on an interior surface 108. Inner liner 106 is of a similar construction as inner liner 38 of primary filter element 30. Filtration construction 100 surrounds the perforated inner liner 106 and also forms an exterior surface 110 of the secondary filter element 82. The filtration construction for the secondary filter element may have an initial efficiency for filtering which is different from the primary filter element. For example, the secondary filter element may have an initial efficiency for filtering which is lower than the initial efficiency for filtering of the primary filter element. As used herein, the term initial efficiency means the propensity to trap particles and debris. In the particular embodiment illustrated in FIG. 1, filtration construction 100 is a filter screen. One example of a filter screen useful in this arrangement is a wire mesh screen, which includes about 3000 openings per square inch. Each of the openings have dimensions of about 0.010×0.014 inches. It has been found that a wire mesh screen filter of this size will remove debris of a size larger than 400 micrometers, thereby preventing their introduction into fluid systems downstream.

In accordance with the invention, the bypass arrangement includes a valve arrangement constructed and arranged to move from the closed position to the open position based upon a selected liquid flow pressure buildup on an upstream side of the primary filter element. That is, when the valve arrangement is in the closed position, fluid flows through the inlet, through the primary filter element into the primary filter element interior, and out through the outlet of the housing. When the pressure buildup on the upstream side of the primary filter element reaches a certain predetermined point, the valve arrangement moves to the open position. This allows fluid which has passed through the secondary filter media and into the secondary filter interior to flow into the primary filter element interior and then through the outlet of the housing.

In the particular embodiment illustrated in FIGS. 1 and 2, one example of a valve arrangement is illustrated generally at 112. In the FIG. 2 embodiment, valve arrangement 112 includes a collar 114 engaged with the closed end cap 42 of the primary filter element 30. Collar 114 is bowl shaped and covers opening 48 in closed end cap 42. Collar 114 defines apertures 116 for allowing fluid flow therethrough. Collar 114 has a central aperture 117, for accommodating a pin, described below. Collar 114 is constructed from carbon spring steel.

Valve arrangement 112 includes a ring 130 engaging collar 114. Ring 130 defines a central aperture 134 having a countersink 136. As illustrated in FIG. 1, ring 130 is positioned within opening 92 of end cap 86 of secondary filter element 82.

Valve arrangement 112 also includes a spring biased seal member 118 for moving into and out of engagement with opening 48. Seal member 118 is illustrated in FIG. 2 as generally half of a spherical shape, and has an overall diameter at 125 which is larger than opening 48 in end cap 42. Seal member 118 also includes a portion at 123 with a diameter which is smaller than opening 48 in end cap 42. As such, seal member 118 may be wedged to tightly fit within opening 48 at engagement 127 to seal the access to the interior of the primary filter through the end cap 42. That is, a seal is formed between end cap surface 49 and seal member surface 129. End cap surface 49, where it engages with seal member surface 129 to form seal 127, includes a bend at a radius of about 0.030 inches. Seal member surface 129, where it engages end cap surface 49 to form seal 127, includes a radius of about 0.63.

Seal member 118 includes a recess 120 for seating a spring 122, and defines a central hole 138 for engaging a pin 124. A washer 128 rests within recess 120 and engages spring 122. Adjacent to recess 120 is a seal 144 for tightly sealing pin 124 in place in hole 138. Seal member 118 includes a force-receiving side 119, which receives the force of fluid pressure, and a filter-interior side 121, which is inside of the filter element interior 46. Seal member 118 may be constructed of powdered metal.

Pin 124 is held in a position generally parallel to the main longitudinal axis of the housing by collar 114. Pin 124 passes through central aperture 134 of ring 130, central aperture 117 of collar 114, and central hole 138 in seal member 118. A wire clip 126 is slidingly fitted over an end of the pin 124 and is snapped into a groove on the pin 124. Ring 130 holds and retains the wire clip 126 securely in place in the groove on pin 124. The wire clip 126 helps to hold all of the components of the valve arrangement 112 in place. The wire clip 126 engages countersink 136 of ring 130, and, with spring 122, pulls ring 130 toward collar 114 at engagement 140. Pin 124 includes a second pair of shoulders 132 for seating an end of spring 122. Spring 122 is, therefore, compressed between second shoulders 132 and recess 120 in seal member 118. Therefore, valve arrangement 112 is held in place due to the cooperation between wire clip 126 and countersink 136 in ring 130, seal member 118 engaging aperture 48, and second shoulders 132 holding spring 122.

Spring 122 biases seal member 118 to block opening 48, and thereby preclude access to filter interior 46 through closed end 34 of primary filter element 30. During operation of the filter, as the primary filter element 30 becomes occluded, pressure inside the filter builds. Fluid passes through secondary filtration construction 100 and through the open end 84 of the secondary filter element. It then passes through apertures 116 and collar 114 and presses on seal member 118 at force-receiving side 119. As the pressure builds, the force the fluid exerts on force-receiving side 119 of seal member 118 increases. Eventually, the force exhibited on force-receiving side 119 becomes greater than the force of spring 122. When that happens, the fluid moves seal member 118 axially along pin 124 out of engagement with opening 48. When seal member 118 is moved out of engagement with opening 48, fluid rushes through secondary filter element 82 into secondary filter interior 94 through opening 84, through the apertures 116 and collar 114, and then through opening 48 in end cap 42. This puts the fluid in the primary filter interior 46 where it then passes through filter housing outlet 20. Once the pressure decreases, for example if this condition were due only to a flow surge or a cold start condition, seal member 118 slides axially back down pin 124 and into engagement to seal off and close opening 48.

Figure 3:
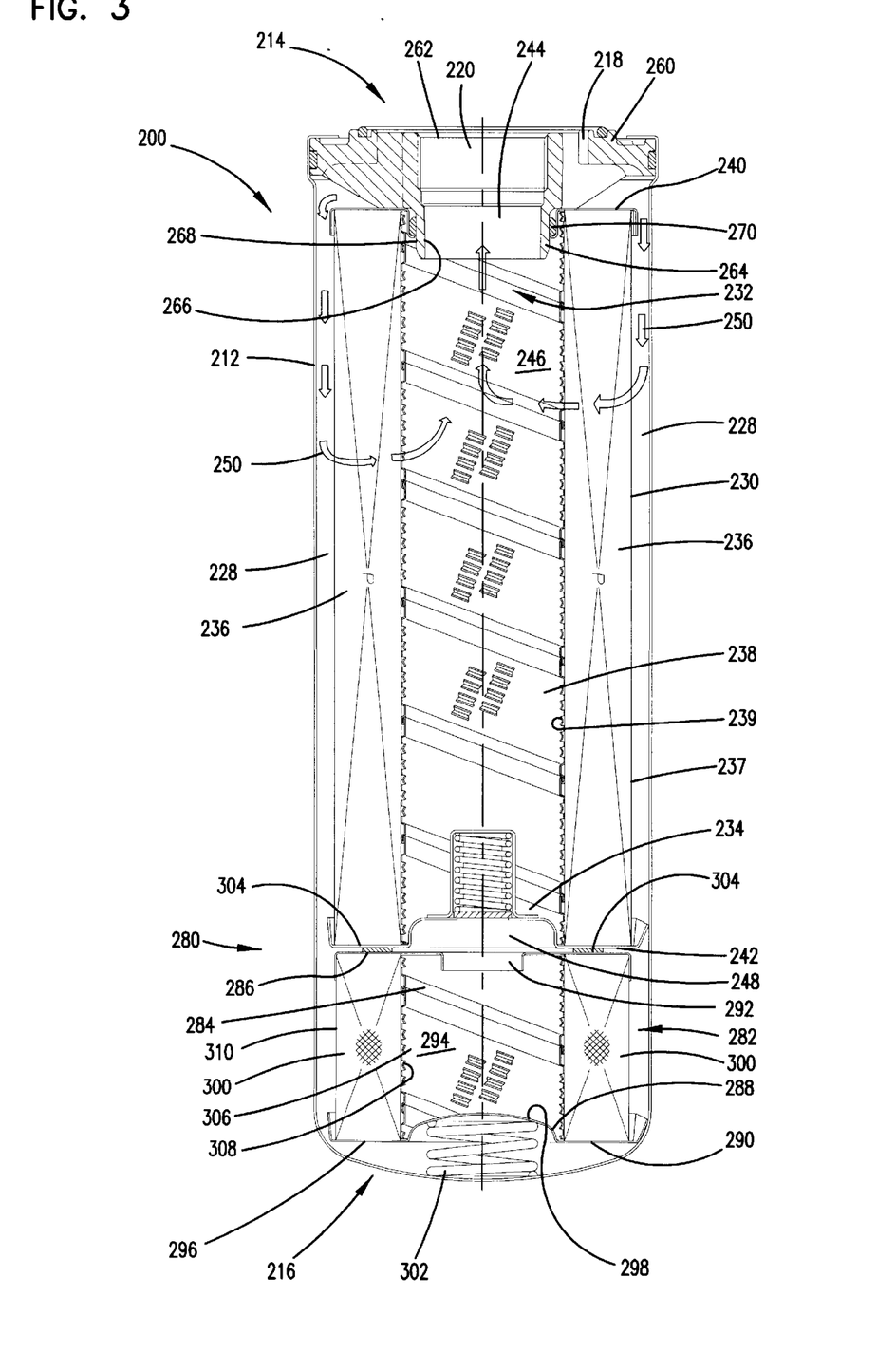
FIG. 3 is a cross-sectional view of a second embodiment of a fluid filter, according to the present invention.
Figure 4:
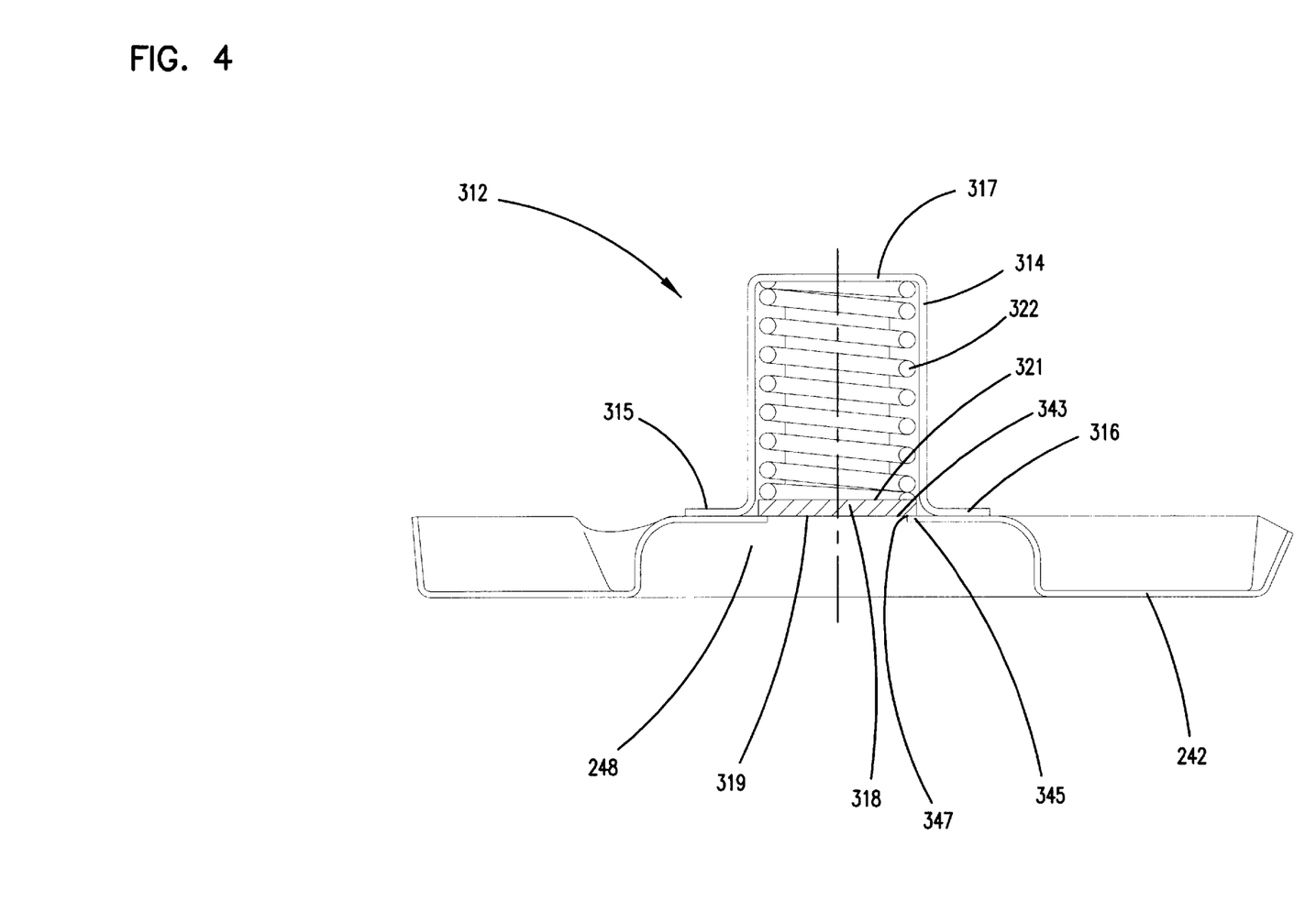
FIG. 4 is an enlarged cross-sectional view of a valve arrangement depicted in FIG. 3, according to the present invention.

FIGS. 3 and 4 illustrate a fluid filter having a second embodiment of a bypass arrangement. The fluid filter arrangement in FIGS. 3 and 4 is illustrated generally at 200. The constructions and principles of operation are analogous to that as described for the first embodiment of FIGS. 1 and 2.

Filter arrangement 200 includes a generally cylindrical filter housing 212 having an open end 214 and a closed end 216. Filter housing 212 includes an inlet 218 and an outlet 220. A filter element 230 is mounted within housing 212, and includes an open end 232 and a closed end 234. Open end 232 is covered by an end cap 240. End cap 240 includes an opening 244 to permit access to an interior 246 of filter element 230. Closed end 234 of filter element 230 is covered by an end cap 242. End cap 242 cooperates with a bypass arrangement. During normal filter operation, end cap 242 completely closes the end 234 of filter element 230, blocking access to filter interior 246 through end 234. When the bypass arrangement is activated, end cap 242 has an opening 248 which is exposed, and allows fluid to pass through opening 248 and into filter interior 246.

Filter element 230 has a perforated inner liner 238 located on an interior surface 239. A filter media 236 surrounds the perforated inner liner 238 and also forms an exterior surface 237 of the filter element 230. Filter media 236 may include a fluted or pleated paper media.

Fluid is filtered by passing through filter element 230 in a direction from exterior surface 237 through filter media 236 and inner liner 238. Arrows 250 in FIG. 3 illustrate a typical flow path of fluid through filter arrangement 200.

Filter arrangement 200 includes a cover 260 to close off open end 214 of housing 212. Cover 260 includes a central cylindrical opening 262 defined by a tubular construction 264. Tubular construction 264 includes an internal cylindrical wall 266 and an external cylindrical wall 268. Tubular construction 264 is sized to fit within open end 232 of filter element 230. Specifically, tubular construction 264 fits within opening 244 in end cap 240 and is in a sealing engagement therewith. A seal 270 forms a radial seal between external wall 268 of tubular construction 264 and end cap 240 of filter element 230. Tubular construction 264 permits a filtered fluid to flow from filter arrangement 200 to a filter head. As such, tubular construction 264 forms part of the housing outlet 220. Internal wall 266 includes threads for mateably engaging the filter head, such that filter arrangement 200 may be spun onto the assembly.

A bypass arrangement is shown in FIGS. 3 and 4 generally at 280. In this particular embodiment, bypass arrangement 280 includes a second filter construction 282 positioned adjacent to the closed end 234 of filter element 230. Secondary filter element 282 is cylindrical in shape and has an open end 284 covered by end cap 286, and a closed end 288 covered by closed end cap 290. End cap 286 defines an open aperture 292 which provides access to an interior 294 to secondary filter element. End cap 290 closes secondary filter element 282 from end 288. End cap 290 includes a relatively straight portion 296 adjacent to the filtration construction 300 and a curved portion forming a dome-like structure 298 adjacent to the filter interior 294. A spring 302 is positioned between closed end 216 of housing 212 and dome-like structure 298. Spring 302 engages dome-like structure 298 to bias secondary filter element 282 toward first filter element 230. An axial seal member 304, a gasket, for example, is positioned between open end cap 286 of secondary filter element 282 and closed end cap 242 of filter element 230.

Secondary filter element 282 has a perforated inner liner 306 located on an interior surface 308. Filtration construction 300 surrounds the perforated inner liner 306 and also forms an exterior surface 310 of the secondary filter element 282. Filtration construction 300 may include, for example, a filter screen such as a wire mesh screen with an initial efficiency for filtering which is different from the primary filter element 230.

Bypass arrangement 280 includes a valve arrangement. One example of a valve arrangement is illustrated in FIGS. 3 and 4 generally at 312. In the example shown in FIG. 3, valve arrangement 312 includes a cage 314 attached at flanges 315, 316 to the closed end cap 242 of the primary filter element 230. Cage 314 is cylindrical in shape and includes an end 317. Cage 314 also includes two openings or windows in either side to allow fluid to pass through into 246. Cage 314 is mounted on closed end cap 242 over opening 248. Cage 314 is constructed from sheet metal and is attached to end cap 242 by spot welds.

Valve arrangement 312 includes a spring biased seal member 318 for moving into and out of engagement with opening 248. Seal member 318 may be generally circular in shape, and have an overall diameter which is larger than opening 248 in end cap 242. Seal member 318 includes a force-receiving side 319, which receives the force of fluid pressure, and a filter-interior side 321, which is inside of the filter element interior 346. Seal member 318 includes a surface 343 near its outer periphery which engages end cap surface 345 to form a seal 347. End cap surface 345 may be along the periphery of opening 248. Seal member 318 may be constructed of aluminum (0.08 inches thick).

A spring 322 is positioned between cage end 317 and seal 318. Spring 322 biases seal member 318 to cover opening 248 and form seal 347, and thereby preclude access to filter interior 246 through closed end 234 of primary filter element 230. During operation of the filter, as the primary filter element 230 becomes occluded, pressure inside the filter builds. Fluid passes through secondary filtration construction 300 and through the open end 284 of the secondary filter element. It then presses on seal member 318 at force-receiving side 319. As the pressure builds, the force the fluid exerts on force-receiving side 319 of seal member 318 increases. Eventually, the force exhibited on force-receiving side 319 becomes greater than the force of spring 322. When that happens, the fluid moves seal member 318 axially within cage 314 and out of engagement with opening 248. When seal member 318 is moved out of engagement with opening 248, fluid rushes through secondary filter element 282 into secondary filter interior 294 through opening 284, and then through opening 248 in end cap 242. This puts the fluid in the primary filter interior 246 where it then passes through filter housing outlet 220. Once the pressure decreases, seal member 318 is biased back into engagement with opening 248 to seal off and close the opening.

A Specific Preferred Embodiment

It will be understood that a wide variety of specific configurations and applications are feasible, using techniques described herein. In this section, a particular fluid filter arrangement with bypass will be described.

The arrangement described would be particularly configured for use in mobile equipment. Such systems typically filter hydraulic fluid at a rate of about 40 gpm.

The housing is constructed from cold rolled steel material. The housing has an outer diameter of about 4.6 inches, and a length of about 14.2 inches. The outlet tube has a diameter of about 1.8 inches.

The primary filter element 30 includes a synthetic media. This media has an efficiency of 98.7% at 15 micro meters, and a typical life of 78 grams of dirt. Installed in the arrangement shown in FIG. 1, the primary filter element has an outside diameter of about 4.1 inches, and an inside diameter of about 2.1 inches.

The secondary filtration construction 100 includes a filter screen of 50×60 mesh. Installed in the arrangement of FIG. 1, the secondary filter has an outside diameter of about 4.1 inches, and an inside diameter of about 2.1 inches.

End caps on the primary filter element 30 are constructed from tin plate steel. First end cap 40 has an outer diameter of about 4.2 inches, and an inner diameter of about 1.8 inches. Second end cap 42 has an outer diameter of about 4.21 inches. The diameter of the opening for the valve arrangement in the second end cap is about 0.9 inches. Second end cap 42 includes curved surface 45 having a radius of about 0.2 inches.

End caps on the secondary filtration construction 100 are constructed from tin plate steel. Open end cap 86 has an outer diameter of about 4.2 inches, and an inner diameter of about 1.1 inches. Closed end cap 90 has an outer diameter of about 4.2 inches.

Radial seal 70 has a resting, noncompressed diameter of about 1.995 inches, and a thickness of about 0.062 inches.

Axial seal 104 has a resting, noncompressed diameter of about 3.25 inches, and a thickness of about 0.062 inches.

A valve arrangement constructed according to FIG. 2 includes pin 124 having a main diameter of 0.2 inches and a length of 3 inches. The diameter of shoulder 132 is about 0.4 inches, and groove for wire clip is about 0.1 inches dia. Pin 124 is constructed from carbon steel.

Spring 122 is a coil with about 11 coils. In an uncompressed state, spring 122 has a length of about 3.00 inches, a diameter of about 0.9 inches, and is constructed from music wire. Spring 122 has a constant of about 45.4 lbs/in. This spring constant causes the bypass arrangement to open at pressures of about 75 psi.

Seal member 118 is constructed from powdered metal. Seal member 118 includes a major diameter at 125 of about 1 inches, and a diameter along portion 123 of about 0.4 inches. Seal member 118 has an overall length between surface 121 and portion 123 of about 0.3 inches.

Collar 114 is constructed from carbon spring steel. Collar 114 has an overall diameter of about 1.4 inches. It includes 3 apertures 116. Each of apertures 116 has a dimension of about 0.3 inches×0.6 inches. Central aperture 117 has a diameter of about 0.2 inches.

The arrangement would be assembled as follows: The spring 122, washer 128, seal member 144 and seal member 118 are slid onto pin 124. This assembly is inserted in a hole 48 of end cap 42. The collar 116 and ring 130 are secured over the opening 48 in the end cap 42. The spring 122 is then compressed using tooling, for example. The wire clip 126 is then slid over the end of the pin 124 and snapped into the groove of the pin 124. The respective filter elements are then assembled within the housing 12, and the cover 60 is secured into place.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A filter arrangement for filtering liquid, the arrangement comprising:
   (a) a housing having an open end and a closed end; said open end having an inlet and an outlet;
   (b) a first construction mounted within the housing; said first construction including filter media extending between first construction first and second end caps; said first construction defining a first open filter interior;
      (i) said first end cap defining an aperture in fluid communication with said first open filter interior; and
      (ii) said second end cap defining an aperture in fluid communication with said first open filter interior;
   (c) a second construction mounted within the housing; said second construction including filter media extending between second construction first and second end caps; said second construction defining a second open filter interior;
      (i) said second construction first end cap defining an aperture in fluid flow communication with said second open filter interior and with the aperture of said first construction second end cap;
      (ii) said second construction second end cap closing said second open filter interior;
   (d) a valve arrangement having an open position and a closed position; said valve arrangement being constructed and arranged to permit fluid flow from the inlet of said housing through said second construction filter media when in said open position; said valve arrangement being constructed and arranged to disallow fluid flow from the inlet of said housing and through said second construction filter media when in said closed position; said valve arrangement configured to move from the closed position to the open position in response to a liquid flow pressure buildup on an upstream side of the filter media of said first construction of at least 75 psi; said valve arrangement including:
      (i) a collar engaging said first construction second end cap and covering the aperture of said first construction second end cap; said collar defining an open interior, a plurality of liquid flow holes, and a collar central aperture;
         (A) said plurality of liquid flow holes providing liquid flow communication between said second open filter interior and said collar open interior;
      (ii) a ring construction engaging said collar; said ring defining a ring central aperture;
      (iii) a seal member and spring; said spring biasing said seal member to selectively engage the aperture of said first construction second end cap; said seal member defining a seal member central aperture;
      (iv) a pin construction having a shoulder; said pin construction extending: through said ring central aperture, through said collar central aperture, and through said seal member central aperture;
         (A) said shoulder seating an end of said spring; said spring extending between said shoulder and said seal member; and
      (v) a clip secured to said pin construction; said clip engaging said ring construction.

2. A filter arrangement according to claim 1 further comprising:
   (a) a curved surface defined by said second construction second end cap; and
   (b) a biasing member compressed between the closed end of said housing and said curved surface of said second construction second end cap.

3. A filter arrangement according to claim 2 further comprising:
   (a) a compressible axial sealing gasket member oriented between said first and second constructions; said biasing member compressing said first and second constructions together at said gasket member to form an axial seal therebetween.

4. A filter element according to claim 3 wherein:
   (a) the filter media of said first construction defines openings of a first size, and said second construction defines openings of a second size that is larger than said first size.

5. A filter arrangement according to claim 4 wherein:
   (a) the filter media of said first construction includes a cylindrical element of pleated paper media.

6. A filter arrangement according to claim 5 wherein:
   (a) the filter media of said second construction includes a wire mesh screen construction; said wire mesh screen construction having about 3000 openings per square inch.

7. A filter arrangement according to claim 6 wherein:
   (a) the outer outlet of said housing includes a tubular construction within the aperture of said first construction first end cap; said tubular construction being in fluid communication with said first open filter interior.

8. A filter arrangement according to claim 7 further including:
   (a) a radial seal between said tubular construction and said first construction first end cap.

9. A filter arrangement according to claim 8 wherein:
   (a) said first construction is cylindrical and includes an outer diameter and an inner diameter; and
   (b) said second construction is cylindrical and includes an outer diameter and an inner diameter.

10. A filter arrangement according to claim 9, wherein
    (a) the inner diameter of said second construction is at least as large as the inner diameter of said first construction.

11. The filter arrangement according to claim 9 wherein:
    (a) the outer diameter of said second construction is equal to the outer diameter of said first construction.

12. A filter arrangement for filtering liquid, the arrangement comprising:
    (a) a housing having an open end and a closed end; said open end having an inlet and an outlet;
    (b) a first construction mounted within the housing; said first construction including filter media extending between first construction first and second end caps; said first construction defining a first open filter interior;
       (i) said first end cap defining an aperture in fluid communication with said first open filter interior; and
       (ii) said second end cap defining an aperture in fluid communication with said first open filter interior;
    (c) a second construction mounted within the housing; said second construction including filter media extending between second construction first and second end caps; said second construction defining a second open filter interior;

(i) said second construction first end cap defining an aperture in fluid flow communication with said second open filter interior and with said first construction second end cap aperture;

(ii) said second construction second end cap closing said second open filter interior;

(iii) said second construction second end cap defining a domed surface;

(d) a compressible axial gasket sealing member oriented between said first and second constructions;

(e) a spring member compressed the closed end between said housing and said domed surface of said second construction second end cap;

(i) said spring member compressing said first and second constructions together at said axial gasket sealing member to form an axial seal therebetween;

(f) a valve arrangement having an open position and a closed position; said valve arrangement being constructed and arranged to permit fluid flow from the inlet of said housing through said second construction filter media when in said open position; said valve arrangement being constructed and arranged to disallow fluid flow from the inlet of said housing and through said second construction filter media when in said closed position; said valve arrangement configured to move from the closed position to the open position in response to a liquid flow pressure buildup on an upstream side of said first construction filter media of at least 75 psi; said valve arrangement including:

(i) a cage assembly secured to said first construction second end cap; and (ii) a seal member and spring; said spring biasing said seal member to selectively engage the aperture of said first construction second end cap;

(A) said seal member and spring being contained by said cage assembly.

13. A filter element according to claim 12 wherein:

(a) the filter media of said first construction defines openings of a first size, and said second construction defines openings of a second size that is larger than said first size.

14. A filter arrangement according to claim 13 wherein:

(a) the filter media of said first construction includes a cylindrical element of pleated paper media.

15. A filter arrangement according to claim 14 wherein:

(a) the filter media of said second construction includes a wire mesh screen construction; said wire mesh screen construction having about 3000 openings per square inch.

16. A filter arrangement according to claim 15 wherein:

(a) the outlet of said housing includes a tubular construction within the aperture of said first construction first end cap; said tubular construction being in fluid communication with said first open filter interior.

17. A filter arrangement according to claim 14 further including:

(a) a radial seal between said tubular construction and said first construction first end cap.

* * * * *